(12) United States Patent
Cherry

(10) Patent No.: US 11,122,786 B2
(45) Date of Patent: Sep. 21, 2021

(54) HEATED FISHING POLE

(71) Applicant: Stanley John Cherry, Lincoln Park, NJ (US)

(72) Inventor: Stanley John Cherry, Lincoln Park, NJ (US)

(*) Notice: Subject to any disclaimer, the term of this patent is extended or adjusted under 35 U.S.C. 154(b) by 0 days.

(21) Appl. No.: 16/882,945

(22) Filed: May 26, 2020

(65) Prior Publication Data

US 2021/0137085 A1    May 13, 2021

Related U.S. Application Data

(60) Provisional application No. 62/931,915, filed on Nov. 7, 2019.

(51) Int. Cl.
*A01K 87/08* (2006.01)
*H05B 3/00* (2006.01)
*H05B 1/02* (2006.01)

(52) U.S. Cl.
CPC ......... *A01K 87/085* (2013.01); *H05B 1/0252* (2013.01); *H05B 3/0014* (2013.01); *H05B 2203/03* (2013.01)

(58) Field of Classification Search
CPC ...... A01K 87/085; A01K 87/08; A01K 87/06; A01K 87/007; A01K 87/00; A01K 87/002; A01K 87/005; A01K 87/02; A01K 87/025; A01K 87/04; H05B 1/0252; H05B 3/0014; H05B 2203/03
See application file for complete search history.

(56) References Cited

U.S. PATENT DOCUMENTS

| | | | | |
|---|---|---|---|---|
| 2,565,633 A | * | 8/1951 | Scott | A01K 87/007 |
| | | | | 362/197 |
| 2,758,592 A | * | 8/1956 | Phipps | A01K 87/08 |
| | | | | 126/208 |
| RE24,858 E | * | 8/1960 | Phipps | A01K 87/085 |
| | | | | 126/208 |
| 3,164,921 A | | 1/1965 | Mavrakis | |
| 4,584,787 A | * | 4/1986 | Aho | A61F 7/034 |
| | | | | 126/204 |
| 4,598,192 A | | 7/1986 | Garrett | |
| 4,646,461 A | | 3/1987 | McLeod | |
| 5,175,953 A | * | 1/1993 | Lesnock | A01K 87/04 |
| | | | | 43/24 |

(Continued)

*Primary Examiner* — Kathleen I Alker
(74) *Attorney, Agent, or Firm* — Boudwin Intellectual Property; Daniel Boudwin

(57) ABSTRACT

A heated fishing pole is provided. The device has a hollow elongated body including at least one hand grip, a first open end, and a second closed end, thereby defining an interior volume. At least one heating element in the interior volume is in thermal communication with the at least one hand grip. The heating element is powered by a power source which is in communication with the at least one heating element. A cap is removably securable to the first open end providing access to the interior volume. When the cap is secured to the first open end, a watertight seal is formed preventing water from getting into the interior volume. A control is disposed on an external surface of either the at least one hand grip or the cap, which can be used to select the amount of heat output from the heating element into the hand grip.

5 Claims, 3 Drawing Sheets

(56) References Cited

U.S. PATENT DOCUMENTS

| | | | | |
|---|---|---|---|---|
| 5,517,786 | A * | 5/1996 | Peissig | A01K 87/085 43/18.1 R |
| 5,655,328 | A | 8/1997 | Childs et al. | |
| 5,934,267 | A * | 8/1999 | Briner | F41B 5/14 124/86 |
| 8,558,140 | B2 * | 10/2013 | Hazlett | B62J 33/00 219/202 |
| 9,821,204 | B2 * | 11/2017 | Wolfe | A63B 71/0619 |
| 9,918,459 | B2 * | 3/2018 | Laws | A01K 97/01 |
| 2008/0272103 | A1 | 11/2008 | Farrington | |
| 2018/0146651 | A1 * | 5/2018 | Leiberg | A01K 87/085 |

* cited by examiner

HEATED FISHING POLE

CROSS REFERENCE TO RELATED APPLICATIONS

This application claims the benefit of U.S. Provisional Application No. 62/931,915 filed on Nov. 7, 2019. The above identified patent application is herein incorporated by reference in its entirety to provide continuity of disclosure.

BACKGROUND OF THE INVENTION

The present invention relates to fishing devices. More particularly, the present invention provides for a heated fishing rod or pole that can provide warmth to a user's hands while holding the device.

Many people in a variety of climates enjoy fishing. Some individuals fish in colder climates, either because that is the type of climate in which their target resides, or because the individual is local to that climate. While fishing, the individual typically holds a fishing rod or a fishing pole while waiting for the fish to bite at the bait. The time the individual waits can vary greatly depending on a number of factors. In colder climates the individual's hands can become cold rather quickly, especially when they are wet. Some individuals elect to wear gloves in these climates, but gloves eliminate the sense of touch needed to feel when a fish bites, and to handle and manipulate the fishing pole or rod. Without gloves, individuals are limited in the amount of time they can expose their hands to the cold before they have to take a break to warm their hands back up.

Devices have been disclosed in the known art that relate to fishing rods and poles. These include devices that have been patented and disclosed in patent application publications. However, the devices in the known art have several drawbacks. Some devices are comprised of multiple layers and heat the entire length of the fishing pole, thereby unnecessarily heating portions of the pole which the individual does not typically touch, resulting in inefficiency. Some devices attach onto the fishing pole and are not protected from the elements and water inherent in fishing. Some devices operate by burning a fuel element and venting the exhaust to produce warmth. Such devices are wasteful and can be an unsafe fire hazard.

The present invention substantially diverges in design elements from the known art and consequently it is clear that there is a need in the art for an improvement to existing fishing devices. In this regard the present invention substantially fulfills these needs.

SUMMARY OF THE INVENTION

In view of the foregoing disadvantages inherent in the known types of fishing devices now present in the prior art, the present invention provides a heated fishing pole wherein the same can be utilized to provide warmth to a user's hands while holding the device. The present heated fishing pole comprises a hollow elongated body including at least one hand grip, a first open end, and a second closed end, thereby defining an interior volume. At least one heating element in the interior volume is in thermal communication with the at least one hand grip. The heating element is powered by a power source which is in communication with the at least one heating element. A cap is removably securable to the first open end providing access to the interior volume. When the cap is secured to the first open end, a watertight seal is formed preventing water from getting into the interior volume. A control is disposed on an external surface of either the at least one hand grip or the cap, which can be used to select the amount of heat output from the heating element into the hand grip.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
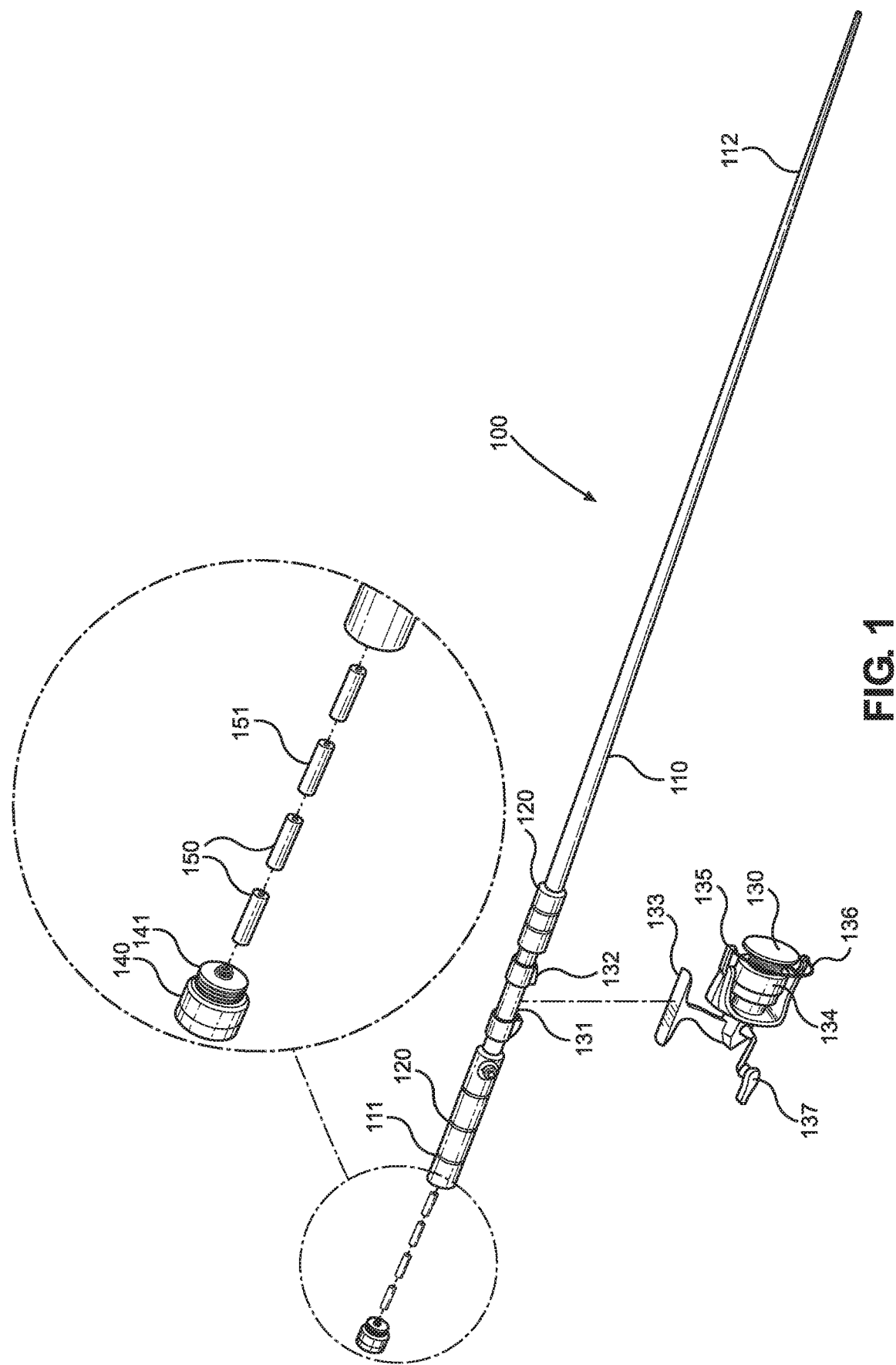
FIG. 1 shows an exploded view of an embodiment of the heated fishing pole.

Reference is made herein to the attached drawings. Like reference numerals are used throughout the drawings to depict like or similar elements of the heated fishing pole. For the purposes of presenting a brief and clear description of the present invention, a preferred embodiment will be discussed as used for the heated fishing pole. The figures are intended for representative purposes only and should not be considered to be limiting in any respect.

Referring now to FIG. 1, there is shown an exploded view of an embodiment of the heated fishing pole. The heated fishing pole 100 comprises a hollow elongated body 110 including at least one hand grip 120, a first open end 111 and a second closed end 112 disposed opposite the first open end 111, thereby defining an interior volume. The hand grips 120 are configured to receive a hand of a user thereon and provide a gripping surface that reduces slippage of the user's hand off of the heated fishing pole 100. In some embodiment, the hand grip 120 is composed of a material that is water repellant and that provides a gripping surface even when wet. Such a material provides advantages to the user as a fishing pole can easily become wet when in use. In one embodiment, the hand grip 120 is disposed over the first end 111 of the hollow elongated body 110. In other embodiments, multiple hand grips 120 are disposed along a length of the first end 111 of the hollow elongated body 110.

The hollow elongated body 110 is flexible and durable to enable the rod to bend without breaking when used to reel in an attached fish. In various embodiments, the elongated body 110 is composed of fiberglass, carbon fiber, bamboo, and other similar natural and synthetic materials that can be used to fashion a fishing pole. In the shown embodiment, the elongated body 110 is cylindrical to provide a slim form factor which is easy to grasp in a manner customarily utilized with fishing poles.

In the shown embodiment, the elongated body 110 includes a reel 130, a reel seat 131, and a reel lock 132. The reel 130 includes a planar reel foot 133, a line spool 134, a line roller 135, a bail 136, and a reel handle 137. The reel foot 133 is sized and shaped to be received by the reel lock 132 and fit within the reel seat 131. The line spool 134, line roller 135, and bail 136 enable a length of fishing line to be stored in a compact fashion, as well as enable an individual to let out a length of the line without the remaining spool of fishing line getting tangled. The reel handle 137 enables a fisherman to spin the line roller 135 around the line spool 134 thereby retracting fishing line that has been let out in such a manner as to compactly and neatly store the fishing line on the line spool 134.

A cap 140 is removably securable to the first open end 111. The cap 140 provides access to the interior volume defined by the hollow elongated body 110. The cap 140 is configured to form a watertight seal when secured to the first open end 111. In the shown embodiment, the cap 140 threadably secures to the first open end 111 via a threading 141 which is complementary to a body threading. The body threading is disposed on an interior surface of the hollow elongated body 110 at a terminal end of the first open end 111. Such a threading 141, mated with the complementary threading, aids in creating the watertight seal. In another embodiment, the body threading is disposed on an exterior surface of the hollow elongated body 110 at the terminal end of the first open end 111. The present disclosure therefore contemplates that a male threading and a complementary female threading can be disposed on both the cap 140 and the terminal end of the first open end 111.

In one embodiment, the interior volume is sized to receive a power source 150 and the power source 150 is removably disposed within the interior volume. In a further embodiment, the power source 150 is at least one battery 151. In such an embodiment, the interior volume is sized to receive one or more batteries 151 therein. In the shown embodiment, four batteries 151 are received in a linear manner to ensure the diameter of the interior volume is as narrow as possible. One of ordinary skill in the art will understand that the batteries 151 can be stacked or arranged in a manner consistent with keeping a desirable form factor of the elongated body 110. In another embodiment, the power source 150 is permanently secured within the interior volume. In yet another embodiment, the power source 150 is removably secured to an exterior surface of the elongated body 110. In another embodiment, the power source 150 is permanently secured to the exterior surface of the elongated body 110.

Figure 2:
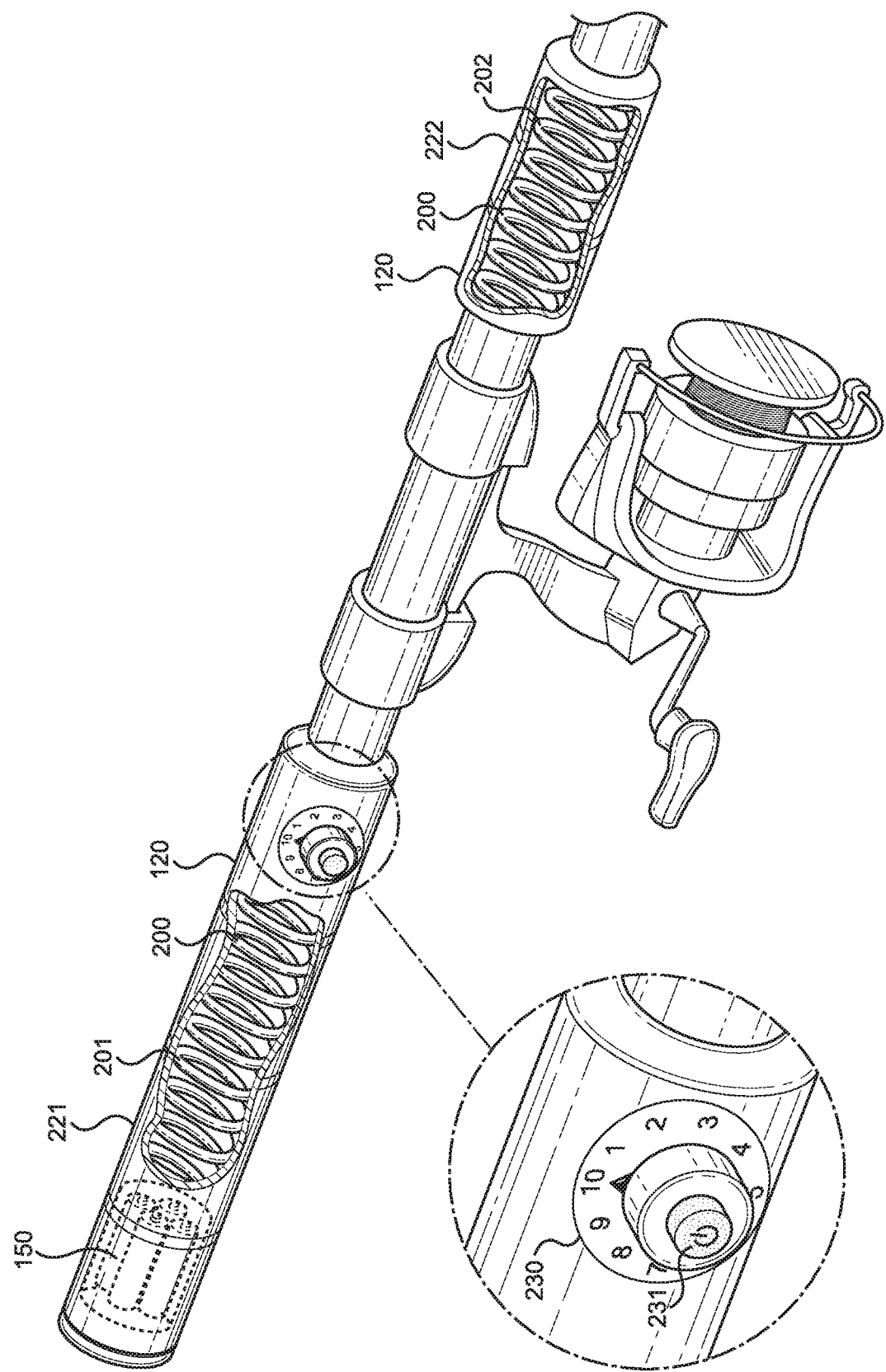
FIG. 2 shows a side cross-sectional view of an embodiment of the heated fishing pole, with a focus on the heating elements.

Referring now to FIG. 2, there is shown a side cross-sectional view of an embodiment of the heated fishing pole, with a focus on the heating elements. At least one heating element 200 is disposed in the interior volume. Each of the heating dements 200 is in thermal communication with at least one hand grip 120. For example, in the shown embodiment a lower heating element 201 is in thermal communication with a lower hand grip 221, and an upper heating element 202 is in thermal communication with an upper hand grip 222. In other embodiments a single heating element 200 is in thermal communication with multiple hand grips 120, multiple heating elements 200 are in thermal communication with a single hand grip 120, and a single heating element 200 is in thermal communication with a single hand grip 120.

The power source 150 is in communication with the at least one heating element 200. A control 230 is also in communication with the at least one heating element 200. In one embodiment, the control 230 is a power button 231 which can be actuated to power the at least one heating element 200. In another embodiment, the control 230 is configured to selectively adjust an amount of heat produced by the heating element 200. In the shown embodiment, the control 230 is disposed on an external surface of the at least one hand grip 120. In such an embodiment, the user can adjust both the amount of heat produced as well as the activation and deactivation of the heating element 200 with minimal movement of their hands while fishing. In the embodiment shown on FIG. 3, the control is disposed on an external surface of the cap. In such an embodiment, the user does not need to move their hands from the hand grips 120 at all to activate and deactivate the power, but can instead depress the power button by compressing the cap against their body, thereby actuating and de-actuating the control 230.

Figure 3:
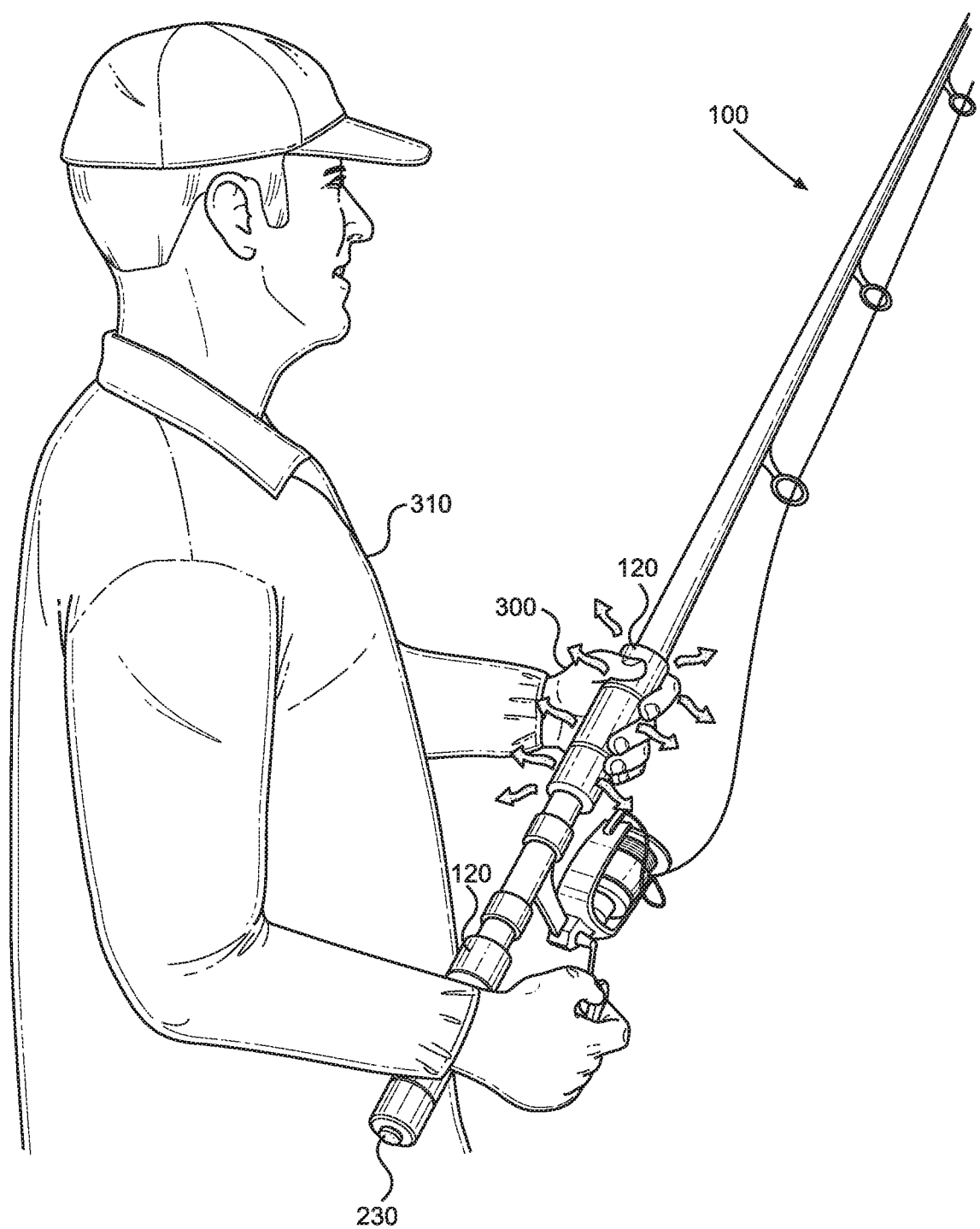
FIG. 3 shows a perspective view of an embodiment of the heated fishing pole, in use.

Referring now to FIG. 3, there is shown a perspective view of an embodiment of the heated fishing pole, in use. In use, the heated fishing pole 100 can warm a hand 300 or both hands 300 of a user 310 while fishing. A control 230 is connected to a power source and at least one heating element. In some embodiments, the control 230 is an on/off switch that can be utilized to turn power to the heating element on or off. In one embodiment, the control 230 comprises three positions; a first position for turning the device off, a second position for providing a low amount of heat, and a third position for providing a high amount of heat. In some embodiments, the control 230 can also be utilized to set a desired amount of heat given off by the heating elements. In one embodiment, the heating elements are in thermal communication with at least one hand grip 120 such that the heat given off directly warms the hand grip 120. In some embodiments, multiple hand grips 120 are heated in such a manner.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heated fishing pole, consisting of:
    a hollow elongated body including at least one hand grip, a first open end, and a second closed end, thereby defining an interior volume;
    wherein the at least one hand grip consists of a diameter greater than a diameter of a remainder of the hollow elongated body;
    at least one heating element disposed within the at least one hand grip;
    a power source in communication with the at least one heating element;
    a cap removably securable to the first open end, the cap providing access to the interior volume;
    wherein the cap is configured to form a watertight seal when secured to the first open end;

wherein the at least one hand grip is in thermal communication with the at least one heating element;

wherein a heat given off by the at least one heating element directly warms the at least one hand grip;

a control disposed on an external surface of the at least one hand grip; and wherein the control is in communication with the at least one heating element.

2. The heated fishing pole of claim 1, wherein the power source is removably disposed in the interior volume.

3. The heated fishing pole of claim 1, wherein the power source is one or more batteries.

4. The heated fishing pole of claim 1, wherein the cap threadably secures to the first open end.

5. The heated fishing pole of claim 1, wherein the control is configured to selectively adjust a heat output from the at least one heating element.

* * * * *